United States Patent [19]
Olivo

[11] Patent Number: 5,988,582
[45] Date of Patent: Nov. 23, 1999

[54] OFFICE SYSTEM FOR MOUNTING UPON A PC MONITOR

[76] Inventor: Nello Olivo, 3828 Fairway Dr., Cameron Park, Calif. 95682

[21] Appl. No.: 09/096,554

[22] Filed: Jun. 12, 1998

[51] Int. Cl.[6] .................................................. B41J 11/02
[52] U.S. Cl. .......................................................... 248/442.2
[58] Field of Search ................................ 248/918, 442.2, 248/457, 447.2, 447, 452, 447.1, 451, 316.4, 218.4, 458, 282.1, 231.41; 460/718; 345/905, 903; 40/341, 594, 124, 718

[56] References Cited

U.S. PATENT DOCUMENTS

| | | | |
|---|---|---|---|
| 1,349,225 | 8/1920 | Rosenblum | 24/527 |
| 3,688,058 | 8/1972 | Findlay | 179/100.2 |
| 3,908,476 | 9/1975 | Folkert | 74/242.11 |
| 4,117,873 | 10/1978 | Crawford | 140/105 |
| 4,402,784 | 9/1983 | Romero-Medrano | 156/446 |
| 4,433,828 | 2/1984 | Spiegelman et al. | 254/29 A |
| 4,583,961 | 4/1986 | Kawasawa et al. | 474/113 |
| 4,802,708 | 2/1989 | Vos et al. | 297/252 |
| 4,869,565 | 9/1989 | Bachman | 312/234 |
| 5,082,235 | 1/1992 | Crowther et al. | 248/918 |
| 5,104,087 | 4/1992 | Wentzloff et al. | 248/44.2 |
| 5,328,145 | 7/1994 | Charapich | 248/442.2 |
| 5,385,327 | 1/1995 | Hegarty et al. | 248/442.2 |
| 5,398,905 | 3/1995 | Hinson | 248/442.2 |
| 5,549,267 | 8/1996 | Armbruster et al. | 248/442.2 |
| 5,638,096 | 6/1997 | Schwartz | 248/442.2 |
| 5,678,792 | 10/1997 | Arguin et al. | 248/205.1 |
| 5,850,998 | 12/1998 | Parsey et al. | 248/223.21 |

*Primary Examiner*—Derek J. Berger
*Assistant Examiner*—Michael Nornberg
*Attorney, Agent, or Firm*—John P. Costello

[57] ABSTRACT

A device for organizing office paraphernalia which uses a PC monitor as a mounting surface. The device is comprised of a shroud mountable to a PC monitor groove, this groove being located behind the faceplate of most PC monitors. The shroud is preferably comprised of two adjustable shroud members coupled together by a spring tensioner. The shroud members have an inner edge, an outer edge, and a front face disposed between the inner and outer edges. A plurality of projections disposed upon the inner edge of the shroud members engage within the PC monitor groove, when the shroud is placed upon a PC monitor. Once in place, the shroud surrounds three sides of the PC monitor and remains tensioned against the monitor, in the proper upright position, through the combined action of the projections disposed within the monitor groove and the spring tensioner holding the shroud members tightly against the monitor. A plurality of accessories may be mounted on the outer edges of the shroud members for holding office paraphernalia such as documents, business cards, pens, mirrors, and diskettes, to name a few. Additionally, the front face serves as a surface for placing "post-it" notes, or other stick-on paraphernalia.

5 Claims, 5 Drawing Sheets

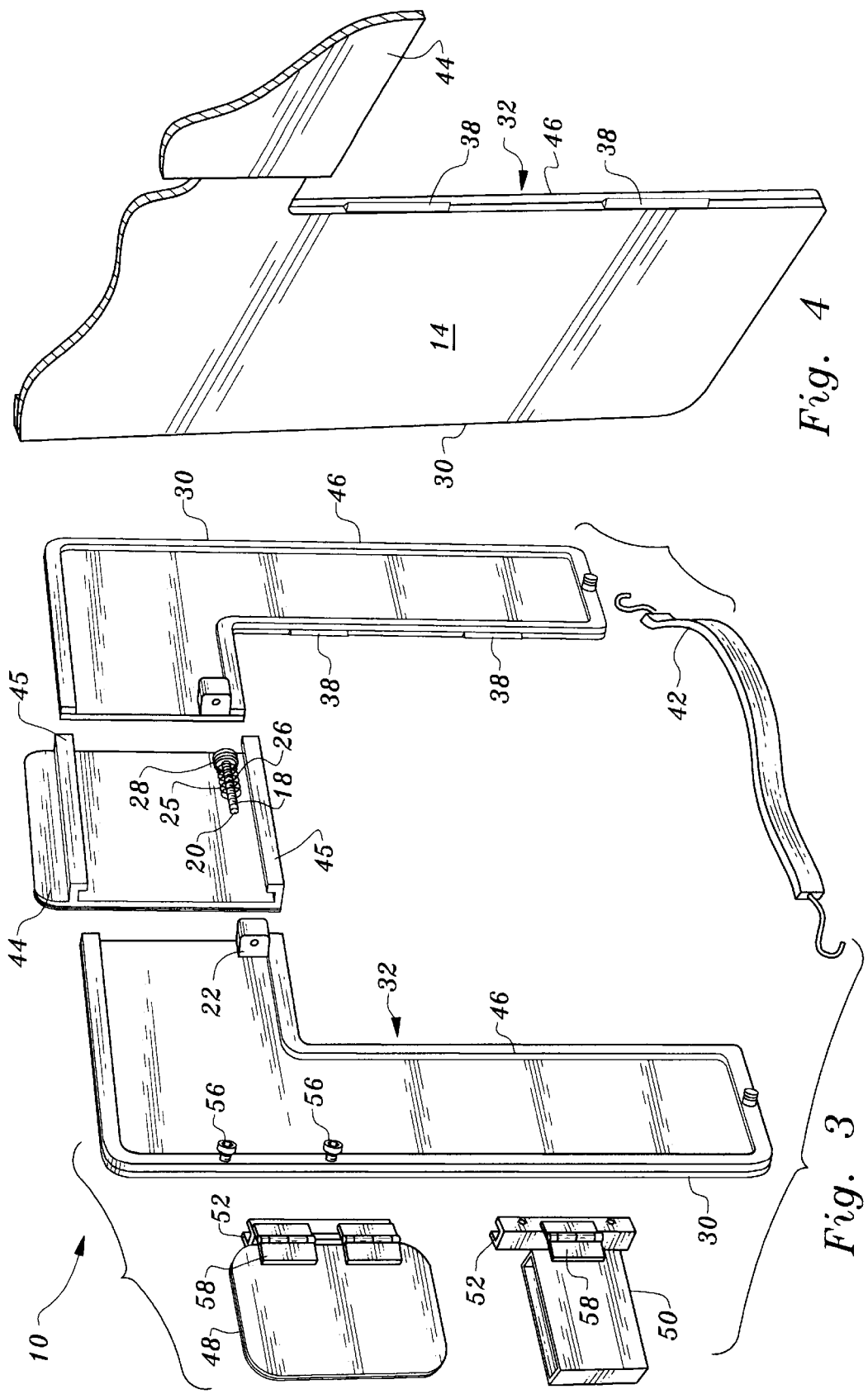

OFFICE SYSTEM FOR MOUNTING UPON A PC MONITOR

BACKGROUND OF THE INVENTION

1. Field of the Invention

This invention pertains to devices for holding and displaying documents and other items in an office environment, and more specifically, to a system for mounting various office paraphernalia upon a personal computer monitor.

2. Description of the Background Art

The modern office environment rewards those who are most efficient in every respect. Efficient use of office space allows workers to be more productive, and thereby increase profits and worker happiness. The typical modern office space, whether in a corporate environment or a home office, now has a personal computer, or PC. The PC has become as indispensable as the phone, fax or file cabinet, in the modern office environment. A fill PC system typically is comprised of a PC monitor, a keyboard, a box or tower containing the computer, and a printer for receiving output from the computer.

A PC system can take up a considerable amount of desktop space and reduce the space available for laying paper, pads, diskette holders, and other items which compete for space in the office environment. Furthermore, in many large corporate environments, there has been a tendency to partition workers into cubicles having a minimal amount of space available for working effectively, in an effort to save costs and increase profits. Therefore, with space in each cubicle at a premium, new methods for increasing office space are always being investigated. One possible way for increasing space has been to use the various PC components as a platform for mounting office items in an effort to save space or increase office efficiency.

The market has produced many after-market or add-on accessories for these various computer components, which are designed to save space, increase visual appearance, or increase office efficiency. Of these components, the PC monitor has spawned the most add-on accessories due to its close proximity to the worker, namely directly within the worker's reach and line of sight.

An example of such an add-on accessory is seen in U.S. Pat. No. 5,082,235, issued to Crowther et al., which discloses a document holder for mounting to a PC monitor comprised of an adjustable clamp for attaching to a PC monitor, and a pair of outward-extending clipboards mounted to the sides of the adjustable clamp. This device allows for documents to be mounted to the clipboards for easy reading or copying.

U.S. Pat. No. 5,385,327, issued to Hegarty et al., discloses a universal document support PC monitor stand. This device is comprised of a horizontal monitor stand having at least one slotted side member coupled perpendicularly to the monitor stand, wherein the side member communicates with the sides of the PC monitor. A plurality of slots imparted into the side member at different heights allow for an armature to be mounted at varying heights, corresponding to a worker's eye level. At the end of the armature can be mounted a clipboard for holding documents.

While the previous devices have made an effort toward saving space by providing a means for mounting documents upon a PC monitor, these devices have fallen short of maximizing the concept of space saving. Specifically, none of these devices have considered mounting an entire office system upon a PC monitor which could not only hold documents, but hold pens, cards, calculators and other office paraphernalia, as well as mount photographs or a mirror, for allowing a worker to maintain a professional office appearance. Additionally, the previous devices have used a series of bulky clamps, or unattractive slotted members, to mount accessories. As a result, these previous devices do not possess a good aesthetic appearance, and in many respects add to the cluttered appearance of an office.

Therefore, a need exists for an entire system which utilizes a PC monitor as a mounting surface, and which allows a plurality of office paraphernalia to be mounted interchangeably thereon. This system would ideally result in a space savings, increase worker efficiency, and have an aesthetic appearance, all in one.

The foregoing patents and other information reflect the state of the art of which the inventor is aware and is tendered with a view toward discharging the inventor's acknowledged duty of candor in disclosing information which may be pertinent to the patentability of the present invention. It is respectfully stipulated, however, that the foregoing patent and other information does not teach or render obvious, singly or when considered in combination, the inventor's claimed invention.

SUMMARY OF THE INVENTION

By way of example and not of limitation, the present invention pertains to a system for mounting a plurality of office paraphernalia upon a PC monitor. This system is capable of mounting business cards, documents, photographs, pens, paper clips, calculators, and any other item within reasonable size and space limitations. In its basic sense, the invention takes the form of a shroud sized to fit upon a PC monitor, wherein the shroud is held on by tension produced by the close fit of the shroud and by a plurality of projections designed to fit within a PC monitor groove located behind the faceplate of most PC monitors. Once fit, the shroud remains surroundingly and upright upon at least three sides of a PC monitor and serves as a mounting surface for a plurality of accessories designed to hold a plurality of office paraphernalia.

In the preferred embodiment, this invention takes the form of a shroud comprised of two slidable L-shaped members which can be tightened around a PC monitor, and provide usable space along three sides of a monitor for the placement of office paraphernalia. One of the key features which make this system so versatile is the narrow side appearance made possible by the unique mounting system which includes a plurality of raised triangulate projections on the inside edge of the shroud members, these projections being designed to fit into a PC monitor groove.

The attachment of the shroud members, within a PC monitor groove, increases the aesthetic appearance of this invention because unsightly clamps, suction cups or brackets are not required to hold the device thereon. Additionally, the system's narrow shroud-like appearance, along three sides of the monitor, continues to its outermost, surrounding edge. It is along this outermost edge that a plurality of accessories for holding office paraphernalia can be mounted. For example, business cards, pens, clocks, calculators, photographs and vanity mirrors are some of the paraphernalia which can be mounted to the shroud members. Consequently, the following objects and advantages are to be achieved by this invention:

An object of the invention is to provide an office system for placing a variety of office paraphernalia that is attachable to a PC monitor.

Another object of the invention is to provide an office system for organizing cluttered office paraphernalia upon a PC monitor.

Still another object of the invention is to provide an office system for attaching to a PC monitor which does not use unsightly clamps, brackets, or suction cups.

Another object of the invention is to provide an office system for attaching to a PC monitor which has a pleasant aesthetic appearance, thereby adding to an office's decor.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a rear perspective exploded view of the office system.

FIG. 4 is a close view of the inside edge of a shroud member showing the preferred triangulate shape of the projections which couple within a PC monitor groove.

DESCRIPTION OF THE PREFERRED EMBODIMENTS

Figure 1A:
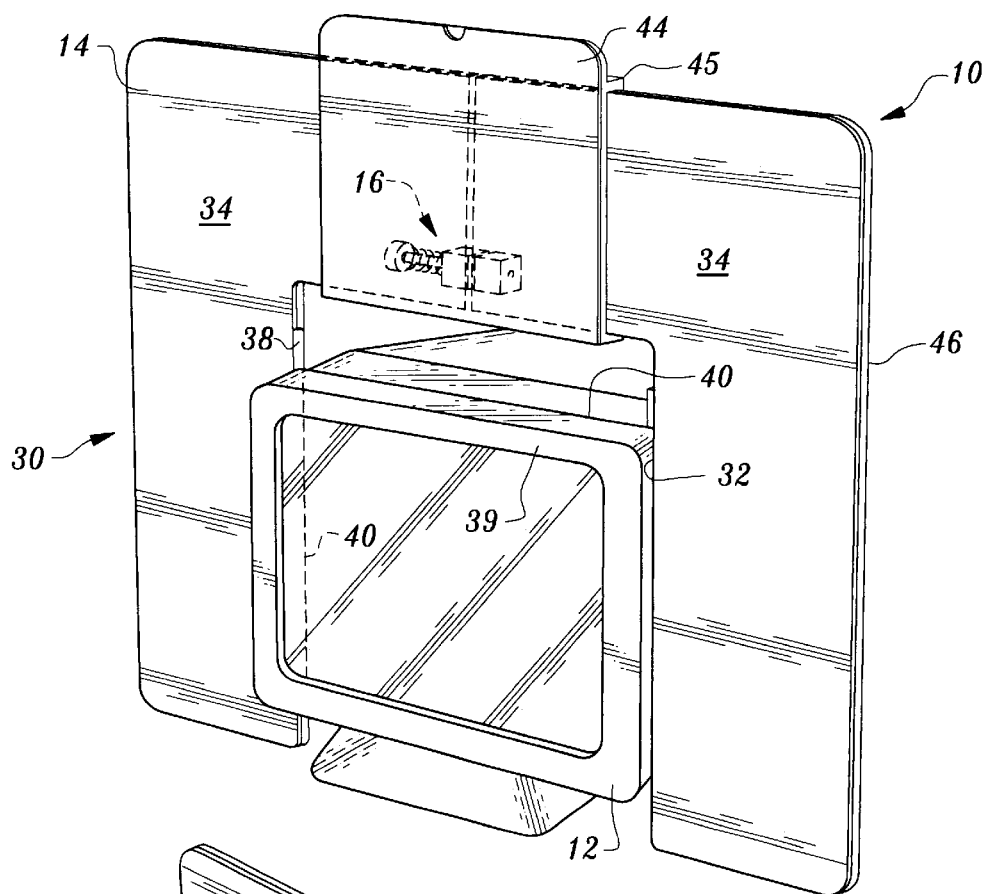
FIG. 1 is a front perspective view of the office system which is the present invention shown being mounted upon a PC monitor with a photo holder accessory attached.
FIG. 1B is a top perspective view of the office system which is the present invention shown fully mounted upon a PC monitor with photo holder, diskette holder, and vanity mirror accessories attached.
Figure 1B:
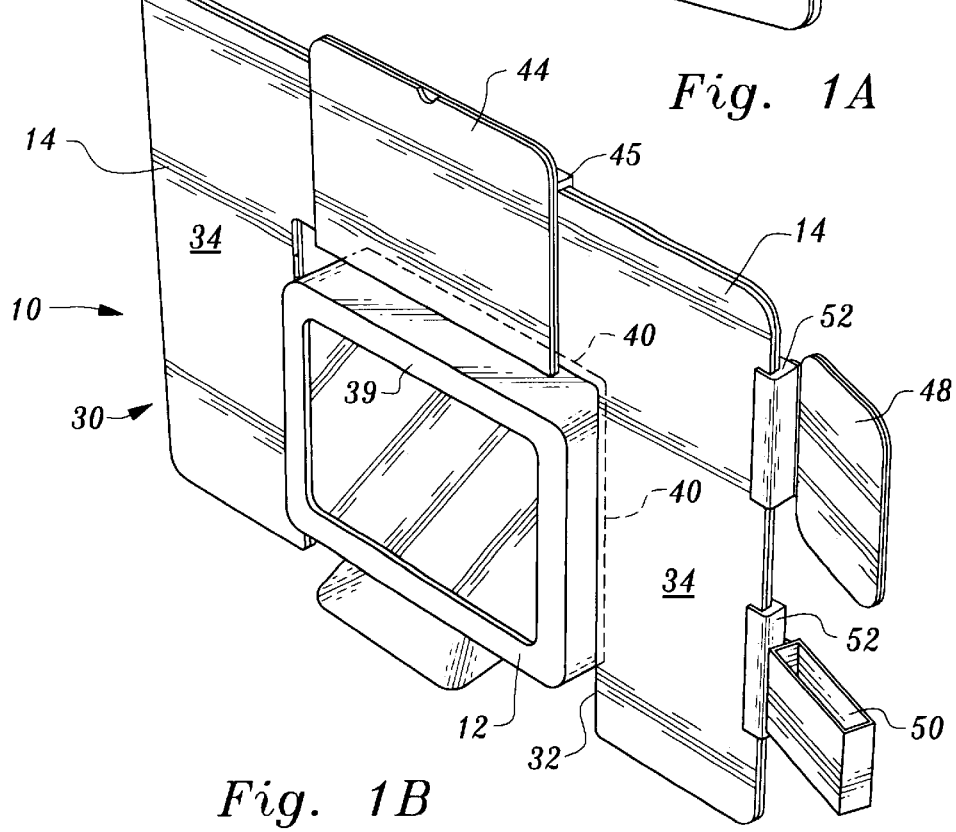
Figure 2:
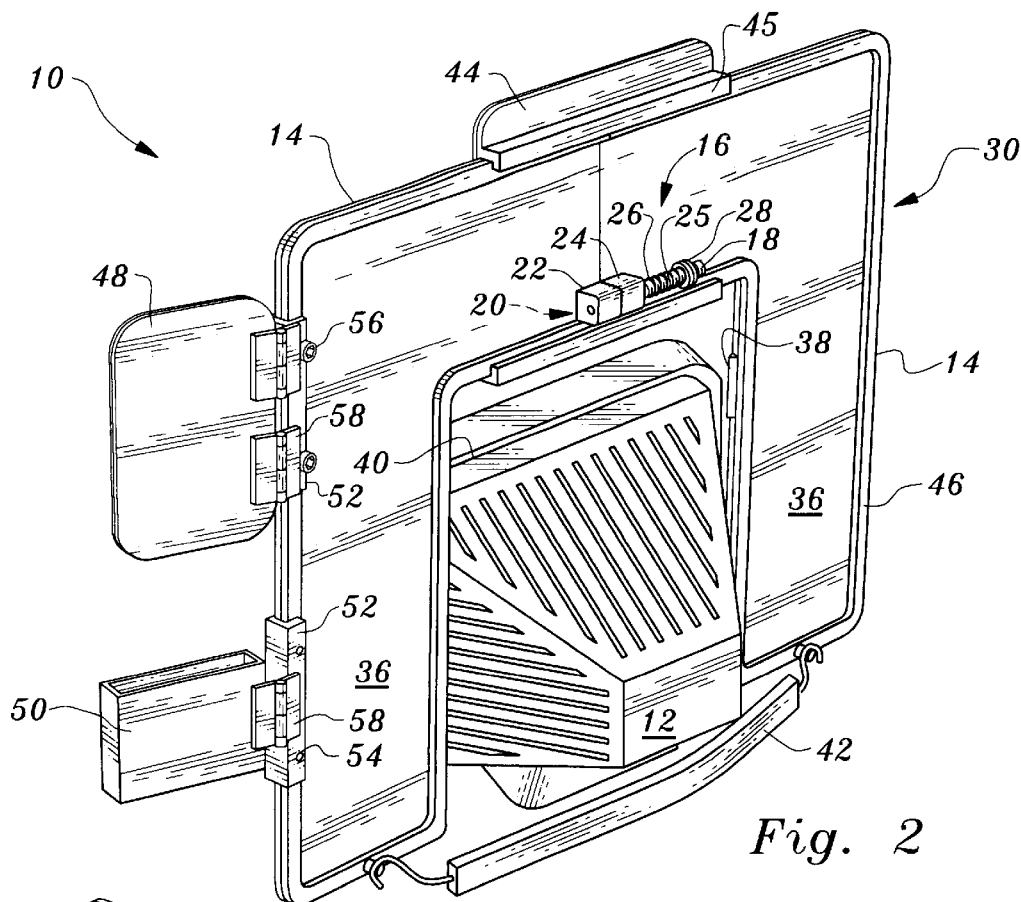
FIG. 2 is a rear perspective view of the office system which is the present invention shown being mounted upon a PC monitor with photo holder, diskette holder, and validity mirror accessories attached.

Referring more specifically to the drawings, the present invention is generally shown by the office system 10 attached to a PC monitor in FIGS. 1A–B. Office system 10 is comprised of first and second shroud members 14, which adjust in relation to each other using adjustable tension means 16. Tension means 16 adjusts shroud members 14 closer to, or away from, each other, depending on the size of the PC monitor 12 to which they must attach. As shown in FIGS. 2–3 tension means 16 is preferably comprised of a bolt shaft 18 threaded at a first end 20 which screw into a correspondingly threaded block 22. A sliding block 24 has no threads, and remains free to slide up and down a non-threaded portion 25 of bolt shaft 18. A spring tensioner 26 and a knurled knob 28 complete the tension means assembly 16. If more tension is desired, knob 28 is adjusted toward sliding block 24, thereby compressing spring 26. Increasing tension causes shroud members 14 to hug PC monitor 12 more tightly.

Shroud members 14 have an outer edge 30, and an inner edge 39, a front face 34 and a rear face 36. Inner edge 32 includes projections 38 which couple to monitor groove 40 located directly behind faceplate 39 of monitor 12. Projections 38 engage monitor groove and hold office system 10 thereon. As shown in FIG. 4, projections 38 are preferably triangulate in shape for engaging easily with monitor groove 40.

First and second shroud members 14 are tensioned against three sides of a PC monitor 12, and projections 38 are tensioned into monitor groove 40 with adjustable tension means 16 positioned at the top of system 10, and also by tension strap 42, which may optionally be placed along the bottom of system 10 for further insuring a tight fit of shroud members 14 upon a PC monitor 12.

Figure 5:
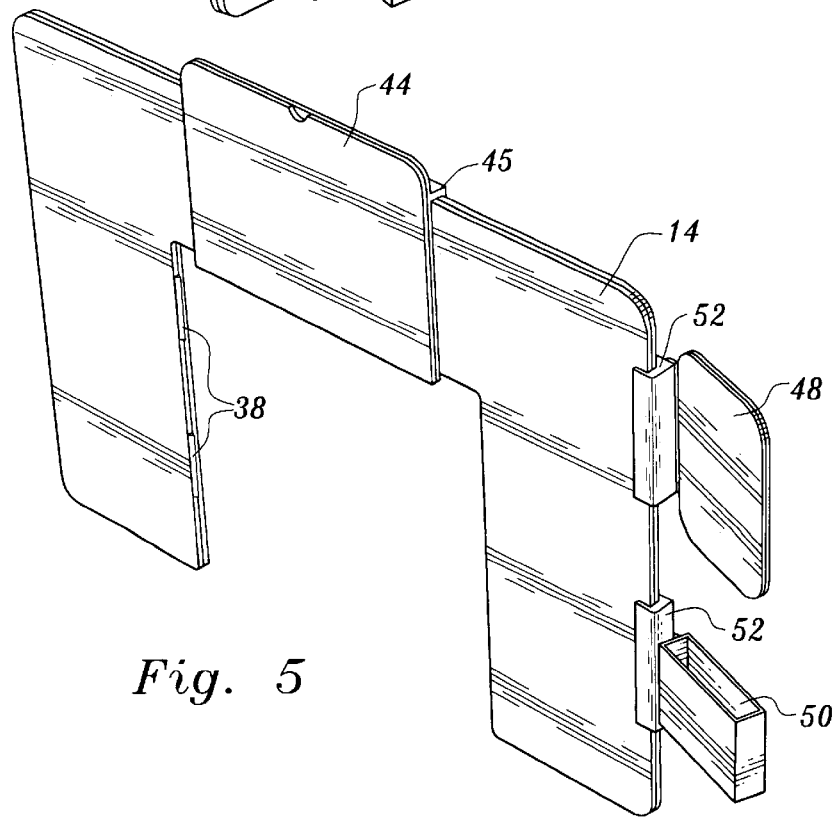
FIG. 5 is a front perspective view of the office system which is the present invention shown with photo holder, diskette holder, and mirror accessories attached.
Figure 6:
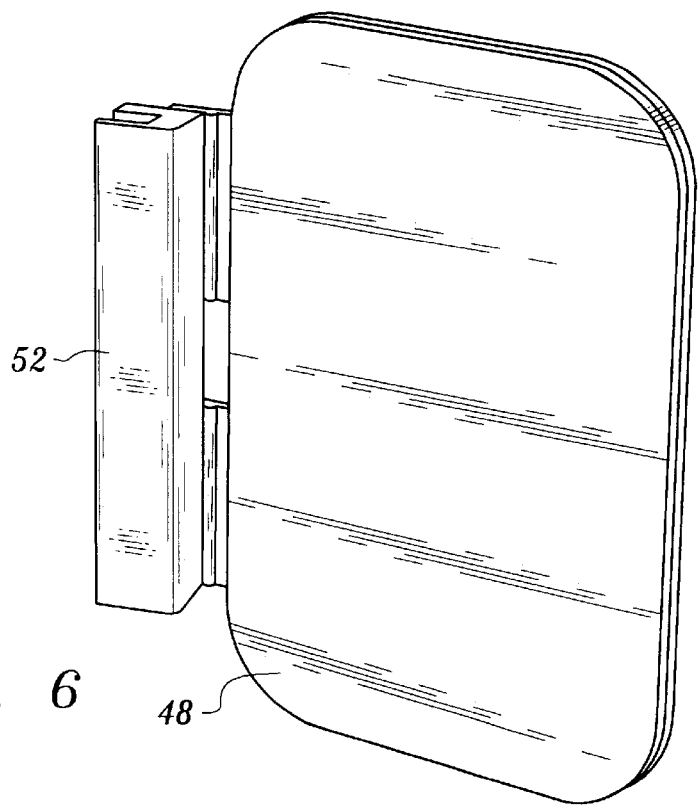
FIG. 6 is a closeup front perspective view of the vanity mirror accessory.
Figure 7:
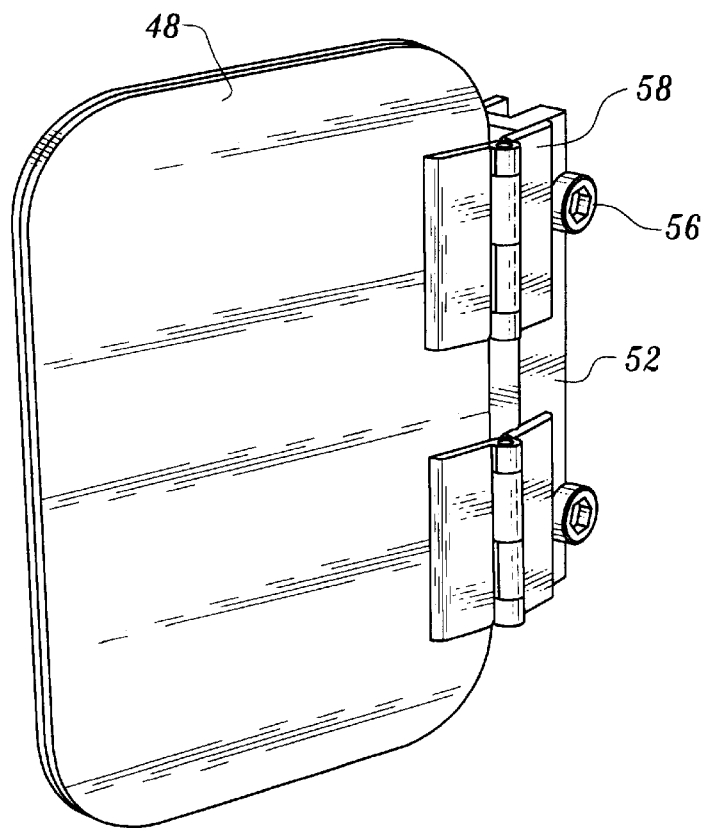
FIG. 7 is a closeup rear perspective view of the vanity mirror accessory.
Figure 8:
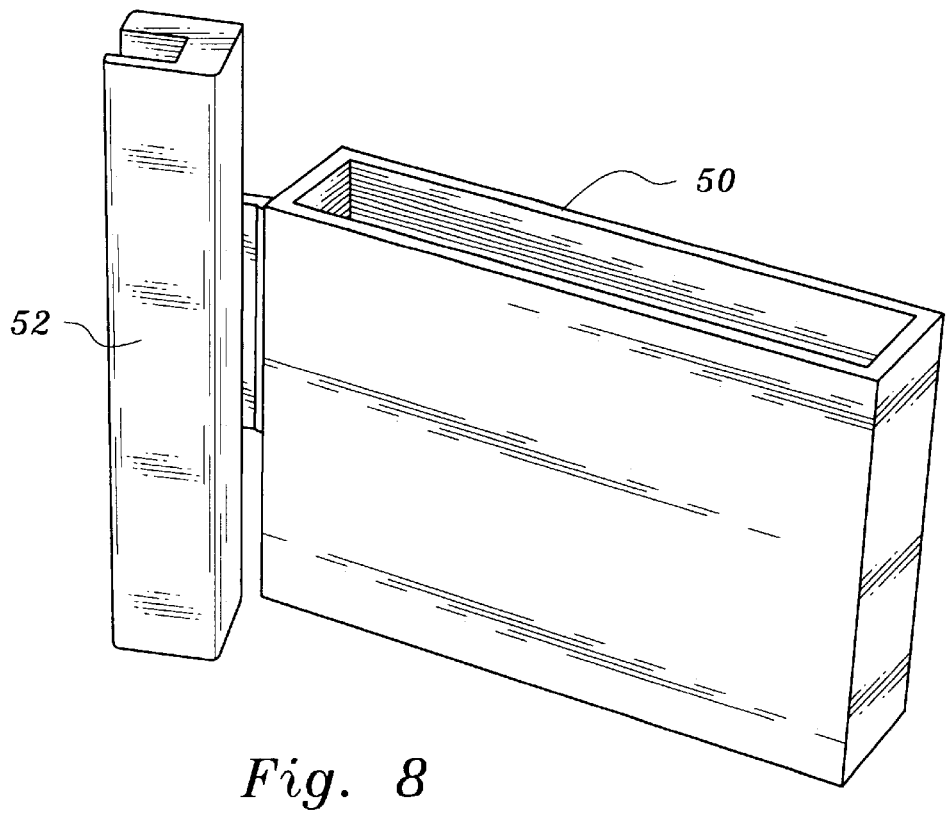
FIG. 8 is a closeup front perspective view of the diskette holder accessory.
Figure 9:
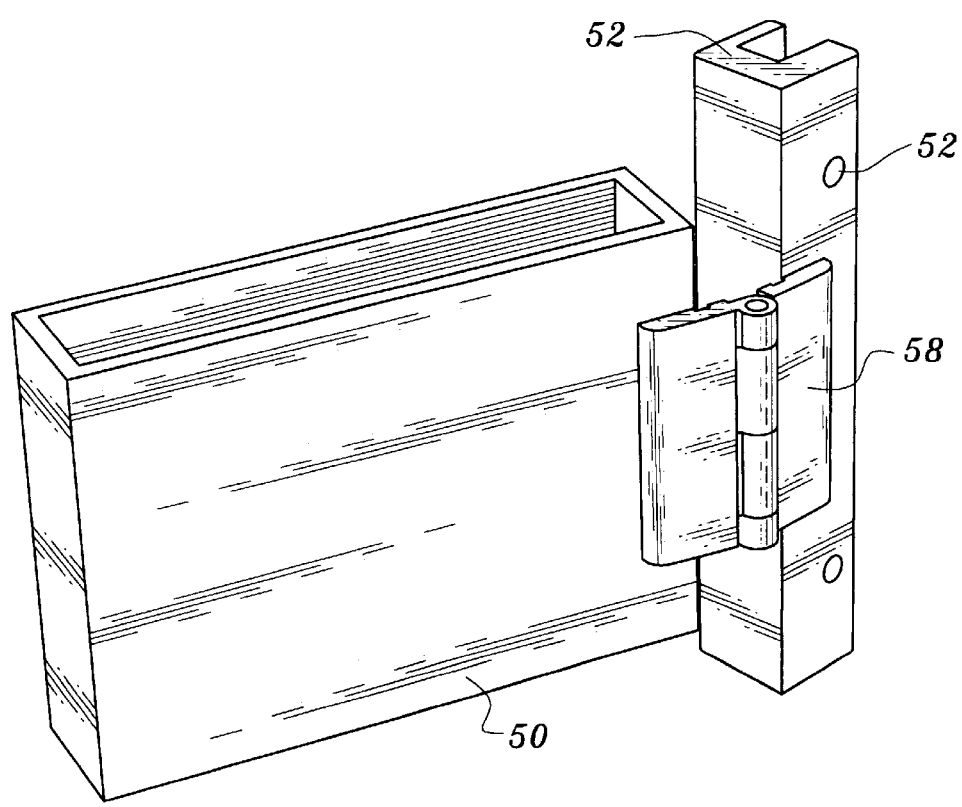
FIG. 9 is a closeup rear perspective view of the diskette holder accessory.

FIGS. 2–3 represent a rear view and a rear exploded view of system 10 respectively. These views show a photo holder accessory 44 centrally mounted upon the top of shroud members 14. Engaging members 45 of photo holder accessory 44 couples to both the outer and inner edges 30, 32 of shroud members 14, forming a channel within which shroud members can slidably move toward or away from each other upon being tensioned by tension means 16. A border strip 46 traces around shroud members 14, border strip 46 providing a surface for coupling photo holder 44 and other accessories. FIGS. 2,3 and 5 illustrate vanity mirror and diskette holder accessories 48, 50, respectively and their attachment to shroud members 14. The accessories shown use a channel engaging member 52 which approximates a three-sided channel for enclosing outer edge 30 and border strip 46. FIGS. 6–9 show closeups of the mirror and diskette holder accessories 48, 50, respectively, and their associated engaging members. Preferably, channel engaging members 52 are sized for fitting snugly around outer edge 30 of shroud member 14 and border strip 46, thereby holding the accessory by frictional engagement. For further insurance, channel engaging members 52 may have holes 54 for fitting hex screws 56, which couple to border strip 46 as shown in FIG. 2, thereby holding an accessory immovably thereon. Additionally, accessories may have hinges 58, for moving the accessory to a desired position.

When in use, system 10 presents a desirable and useful addition to any office space. Photographs may be placed inside photo holder accessory 44, thereby taking the place of stand-alone picture frames and the like. Diskette holder accessory 50 allows computer diskettes to be readily accessible for use and vanity mirror accessory 48 allows a worker to have a ready means for checking and maintaining a professional office appearance. Other accessories such as a business card holder, a pen holder, or a clipboard, could all be attached in similar fashion to shroud members 14 in the manner previously described. The attachment of numerous accessories allows a significant amount of desk space to be freed up from the clutter of scattered office paraphernalia.

Additionally, front face 34 of shroud members 14 provide a flat surface having a number of utilities. For example, front face 34 could be used for placing "post-it" notes or a stick-on calendar. Shroud members 14 could also be made from tinted plexiglass, to allow for a see-through effect, and to reduce glare from sunlight filtering through an office window. Shroud members 14 could also serve as a surface for placing designs or artwork, thereby increasing the aesthetics of any office space within which the system is mounted.

Accordingly, the present invention provides an office system for mounting upon a PC monitor, whereupon a plurality of accessories can be attached for purposes of reducing office clutter and increasing worker efficiency.

Although the description above contains many specificities, these should not be construed as limiting the scope of the invention, but as merely providing illustrations of some of the presently preferred embodiments of this invention. Thus the scope of this invention should be determined by the appended claims and their legal equivalents.

I claim:

1. An apparatus for a PC monitor having a monitor groove, the apparatus comprising:

A shroud capable of being sized to fit in a tensioned relation against said PC monitor, said shroud comprising a planar member, having a front face and a back face, an outer edge and an inner edge, said inner edge having vertically aligned triangulate-shaped projections, said projections for engaging vertically with said monitor groove, said shroud simultaneously tensioning said inner edge against said PC monitor and tensioning said projections within said monitor groove.

2. The device as recited in claim 1, further comprising a plurality of accessories for holding office paraphernalia, said accessories mountable upon said outer edge of said shroud.

3. An apparatus for mounting upon a PC monitor having a monitor groove, the apparatus comprising:

An adjustable shroud, said shroud comprising a planar member, having a front face and a back face, an outer edge and an inner edge, said inner edge having a plurality of vertically aligned triangulate shaped projections for engaging vertically within said monitor groove, said shroud mounting upon said PC monitor so as to bring said inner edge into tensioned contact against said PC monitor and simultaneously tensioning said projections within said monitor groove, said shroud remaining surroundingly and upright upon at least three sides of said PC monitor.

4. The device as recited in claim 3, further comprising a plurality of accessories for holding office paraphernalia, said accessories mountable upon said outer edge of said shroud.

5. An apparatus for mounting on at least three sides of a PC monitor having a monitor groove, the apparatus comprising:

First and second shroud members, each of said shroud members being planar in shape and having a front face, and a back face, an outer edge and an inner edge, said inner edge having a plurality of vertically aligned triangulate shaped projections for engaging vertically with said PC monitor groove said shroud members being slidably coupled together with an adjustable spring tensioner, said spring tensioner drawing said shroud members together to bring said vertically aligned triangulate shaped projections into tensioned contact with said monitor groove, said projections and said spring tensioner combining to hold said shroud members surroundingly and upright upon at least three sides of said PC monitor, said outer edge of said shroud members providing a mounting surface for mounting a plurality of accessories, said accessories for holding a plurality of office paraphernalia.

* * * * *